(12) United States Patent
Watanabe et al.

(10) Patent No.: US 6,381,822 B1
(45) Date of Patent: May 7, 2002

(54) METHOD AND APPARATUS FOR MANUFACTURING FRICTION PLATE

(75) Inventors: Tadashi Watanabe, Kakegawa; Ken Haginoya, Fukuroi, both of (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/332,146

(22) Filed: Jun. 14, 1999

(30) Foreign Application Priority Data

Jun. 15, 1998 (JP) .......................................... 10-167087

(51) Int. Cl.⁷ ................................................ B23P 17/00
(52) U.S. Cl. ............................ 29/412; 29/411; 29/415; 72/327; 72/324; 83/25; 83/29; 83/40
(58) Field of Search .......................... 29/412, 411, 415; 72/327, 324; 83/25, 29, 40, 41, 139, 140, 685, 686

(56) References Cited

U.S. PATENT DOCUMENTS 3,871,254 A * 3/1975 Whistler, Jr. et al. ......... 83/139
4,828,642 A * 5/1989 Juncal ........................ 156/268
5,005,281 A * 4/1991 Burns .......................... 29/596

* cited by examiner

*Primary Examiner*—S. Thomas Hughes
*Assistant Examiner*—John C. Hong
(74) *Attorney, Agent, or Firm*—Miles & Stockbridge P.C.

(57) ABSTRACT

The present invention provides a method for manufacturing a plurality of friction plates obtained by adhering friction members to substantially annular core plates, comprising the steps of simultaneously stamping a plurality of coaxial core plates having different diameters with remaining joint portions therebetween, simultaneously stamping a plurality of substantially annular and coaxial friction members having different diameters corresponding to the core plates and with remaining joint portions therebetween to permit adhesion to the core plates, and stamping the joint portions of the friction members and the core plates when or after the friction members are adhered to the core plates.

6 Claims, 4 Drawing Sheets

METHOD AND APPARATUS FOR MANUFACTURING FRICTION PLATE

BACKGROUND OF THE INVENTION

1. Field of the Invention

The present invention relates to method and apparatus for manufacturing a friction plate in used for an automatic transmission and/or a lock-up clutch of a vehicle.

2. Related Background Art

In order to manufacture a plurality of friction plates having different diameters, for example, as shown in FIG. 7, it is known in the art to simultaneously perform a process for making a core plate and a process for making a friction member.

In FIG. 7, a large diameter core plate 51 and a small-diametered core plate 52 having a diameter smaller than the core plate 51 are simultaneously stamped, and independent large diameter core plate 51 and small-diametered core plate 52 are completely separated.

On the other hand, a large-diametered friction ring 53 corresponding to the large-diametered core plate 51 and a small-diametered friction ring 54 corresponding to the small-diametered core plate 52 are simultaneously stamped, and independent large-diametered friction ring 53 and small-diametered friction ring 54 are completely separated.

The large-diametered friction ring 53 is adhered to the large-diametered core plate 51 obtained in this way by an adhesive of the like, and the small-diametered friction ring 54 is adhered to the small-diametered core plate 52 by an adhesive of the like, thereby obtaining two friction plates 50, 60 having different diameters. Adhesion may be effected in different processes or may be effected in the same process at different times.

The aforementioned conventional manufacturing method has the following problems.

First of all, the number of adhering processes is increased depending upon the number of kinds of the friction plate, and, in set change, if the adhesion is effected in the same process, twice the time is required for the number of kinds of friction plate.

Further, when the adhesion of the friction plates having different diameters is effected in the same process, great time will be required due to set change in equipment.

SUMMARY OF THE INVENTION

Accordingly, an object of the present invention is to solve the above-mentioned problems.

To solve the above problems, the present invention provides a method for manufacturing a plurality of friction plates obtained by adhering friction members to substantially annular core plates, comprising the steps of simultaneously stamping a plurality of coaxial core plates having different diameters with remaining joint portions therebetween, simultaneously stamping a plurality of substantially annular and coaxial friction members having different diameters corresponding to the core plates and with remaining joint portions therebetween to permit adhesion to the core plates, and stamping the joint portions of the friction members and the core plates when or after the friction members are adhered to the core plates.

Further, the present invention provides an apparatus for manufacturing a plurality of friction plates obtained by adhering friction members to substantially annular core plates, comprising means for simultaneously stamping a plurality of coaxial core plate having different diameters with remaining joint portions therebetween, means for simultaneously stamping a plurality of substantially annular and coaxial friction members having different diameters corresponding to the core plates and with remaining joint portions therebetween to permit adhesion to the core plates, and means for stamping the joint portions of the friction members and the core plates when or after the friction members are adhered to the core plates.

According to the present invention, the plurality of kinds of friction plates having different diameters can be adhered simultaneously. Further, the number of adhering processes can be reduced or the adhering time can be reduced greatly.

Furthermore, the number of set changes in the equipment can also be reduced, thereby improving productivity.

DETAILED DESCRIPTION OF THE PREFERRED EMBODIMENTS

Figure 1A:
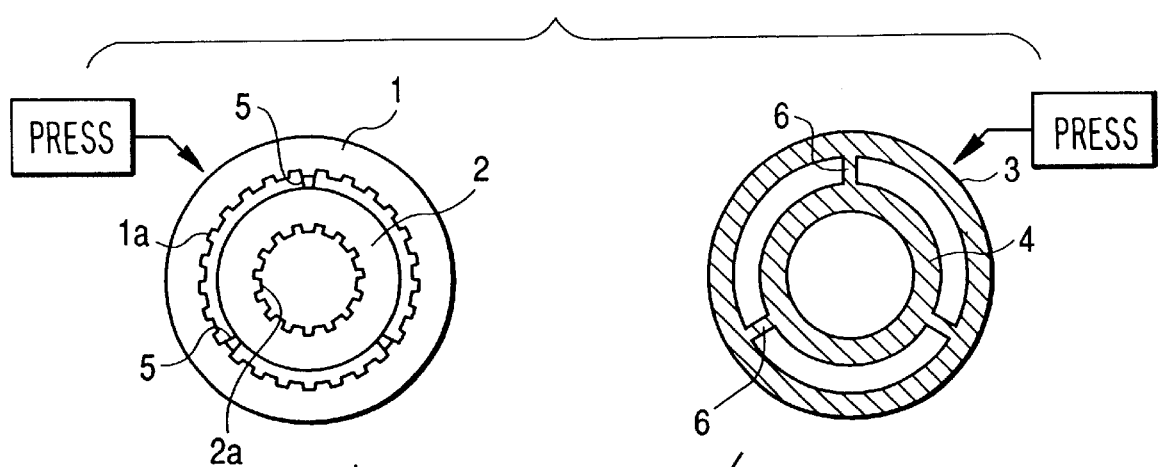
FIGS. 1A, 1B and 1C are plan views showing a flow of manufacturing processes common to embodiments of the present invention.

The present invention will now be fully explained in connection with embodiments thereof with reference to the accompanying drawings. Incidentally, in the drawings, same elements are designated by same reference numerals.

Figure 1B:
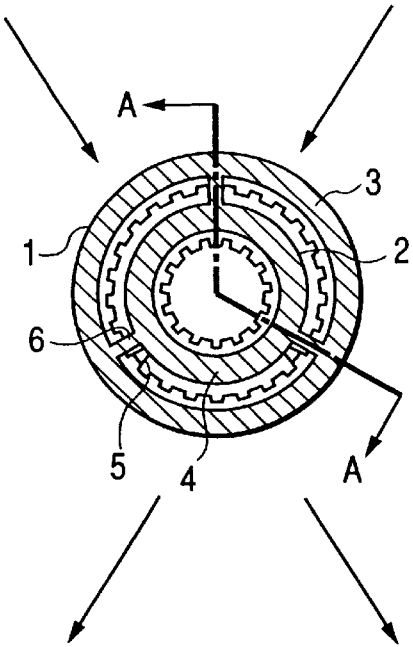
Figure 1C:
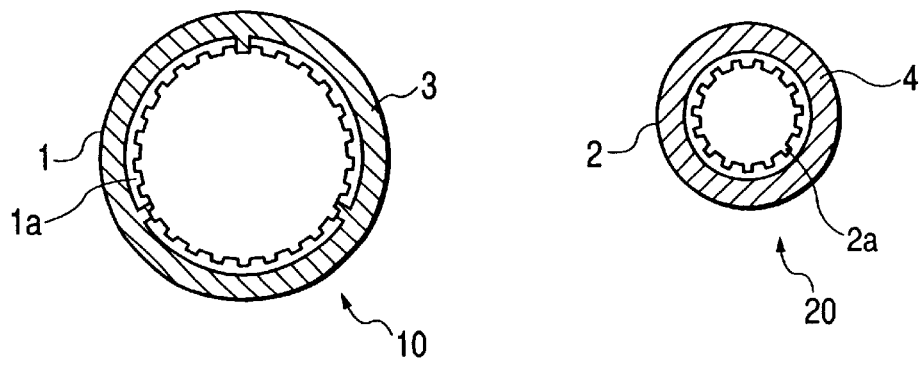

FIGS. 1A to 1C are plan views showing a flow of a manufacturing processes common to embodiments of the present invention which will be described hereinbelow, where FIG. 1A shows a process in a first stage, FIG. 1B shows a process in a second stage and FIG. 1C shows a process in a third stage.

FIGS. 1A to 1C show one example of a flow of processes or steps when large and small friction plates having different diameters are manufactured. First of all, in the first stage (FIG. 1A), a substantially annular large-diametered core plate 1 having an inner spline 1a and a substantially annular small core plate 2 having an inner spline 2a and having a diameter smaller than that of the large core plate 1 are formed by simultaneously stamping them from a steel plate having a predetermined thickness by means of a press (not shown).

A press is a conventional mechanism which simultaneously stamps plurality of substantially annular and coaxial core plates having different diameters with a joint portion remaining therebetween.

In this case, three joint portions 5 equidistantly spaced in a circumferential direction are provided for jointing the spline 1a of the large core plate 1 and the outer periphery of the small core plate 2. Accordingly, due to the presence of the joint portions 5, the large core plate 1 is integrally jointed to the small core plate 2 at this point.

Further, simultaneously, in the first stage (FIG. 1A), a substantially annular large-diametered friction member 3 having a diameter corresponding to that of the large core plate 1 and a substantially annular small-diametered friction member 4 having a diameter corresponding to that of the small core plate 2 are formed by simultaneously stamping them from a friction tape by means of a press (not shown).

A press is a conventional mechanism which simultaneously stamps plurality of substantially annular and coaxial friction members having different diameters corresponding to the core plates with a joint portion remaining therebetween to permit adhesion to the core plates.

In this case, three joint portions 6 equidistantly spaced in a circumferential direction are provided for jointing the inner periphery of the large-diametered friction member 3 and the outer periphery of the small-diametered friction member 4. Accordingly, due to the presence of the joint portions 6, the large-diametered friction member 3 is integrally jointed to the small-diametered friction member 4 at this point.

Next, in the second stage (FIG. 1B), an adhesive is coated on upper surfaces of the integrally formed large core plate 1 and small core plate 2, and the integrally formed large-diametered friction member 3 and small-diametered friction member 4 are rested on the integrally formed large core plate 1 and small core plate 2 with peripheries thereof aligned with each other. In this case, the three joint portions 5 jointing between the large core plate 1 and small core plate 2 and the three joint portions 6 jointing between the large-diametered friction member 3 and small-diametered friction member 4 are overlapped with each other. Incidentally, while an example that the number of the joint portions 5, 6 is three, respectively, was explained, such number can freely be selected from one, two, four or more.

The core plates and the friction members in the condition of the second stage (FIG. 1B) are rested on an adhering apparatus (described later), where heat and pressure are applied simultaneously. Upon or after adhesion by such heat and pressure, all of the joint portions 5, 6 are stamped or removed by a punch (described later), so that a friction plate 10 in which the large-diametered friction member 3 is adhered to the large core plate 1 is separated from a friction plate 20 in which the small-diametered friction member 4 is adhered to the small core plate 2. Thereby obtaining independent or discrete articles. This condition is shown as a third stage (FIG. 1C).

First Embodiment

Figure 2:
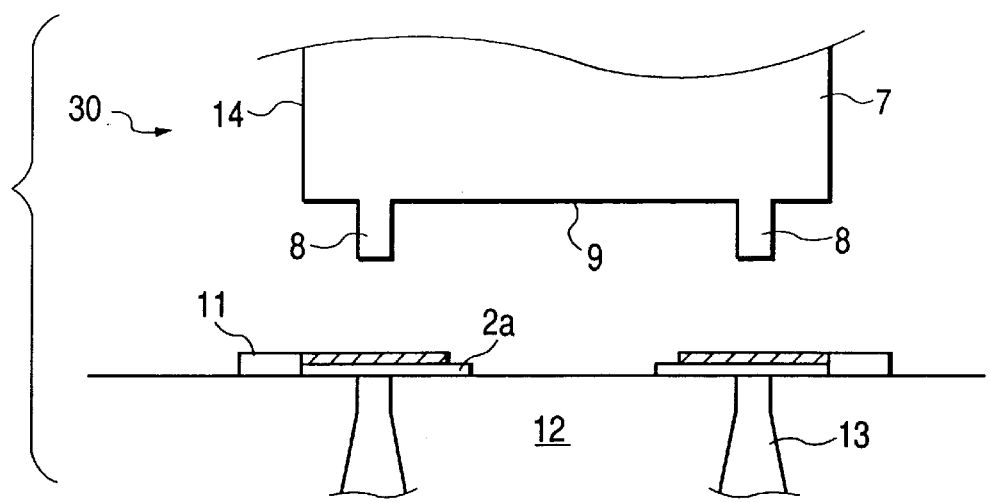
FIG. 2 is a side view of a friction member adhering apparatus used in adhering and stamping processes in a first embodiment of the present invention, a part of which is a sectional view taken along the line A—A in FIG. 1B.
Figure 3:
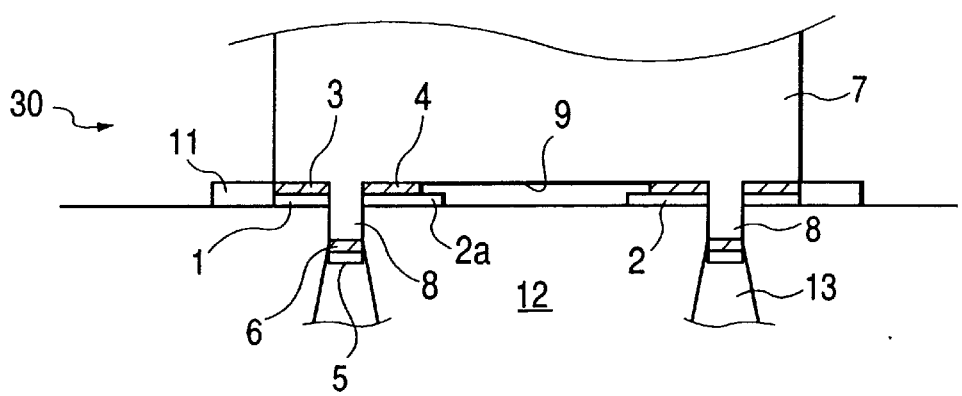
FIG. 3 is a side view of the friction member adhering apparatus of FIG. 2, showing a condition after joint portions are stamped.

FIGS. 2 and 3 are side views of adhering and stamping processes in a first embodiment of the present invention, a part of which is a sectional view taken along the line A—A in FIG. 1B.

In FIG. 2, a friction member adhering apparatus 30 for adhering and stamping the friction members and the core plates stamped by a press (not shown) comprises an urging member 14 integrally including a press portion 7 for urging the friction members against the core plates and a die 12 which is disposed below the urging member 14 and on which the friction members and the core plates are rested. If necessary, the die 12 is pre-heated.

The number of the punches 8 of the urging member 14 is the same as the number of the joint portions so that the joint portions 5, 6 of the friction members and of the core plates can be stamped or removed. A lower surface of the press portion 7 defines an urging surface 9.

A substantially annular positioning frame for positioning and holding the friction members and the core plates is protruded from the die 12 disposed below the urging member 14 in a confronting relationship to the latter. The positioning frame 11 may be constituted by a plurality of non-circular positioning frame portions arranged at predetermined positions along a circumferential direction. By using the positioning frame 11, the friction members and the core plates fed from the press (not shown) are rested on the die 12 at predetermined positions. The die 12 is provided with discharge ports 13 for discharging the stamped joint portions, which parts are disposed in a confronting relationship to the joint portions 5, 6.

The urging member 14 is driven by a drive mechanism (not shown) to be lowered toward the integrally formed friction members and core plates rested on the die 12. When the punches 8 are firstly contacted with the joint portions 5, 6 and are further lowered, the joint portions 5, 6 are stamped or removed by the punches 8. When the urging member 14 is further lowered, the urging surface abuts against the friction members, thereby urging the friction members and the core plates.

This condition is shown in FIG. 3. The stamped joint portions 5, 6 are separated from the large core plate 1 and the small core plate 2, and the large-diametered friction member 3 and the small-diametered friction member 4, respectively, and are discharged into the discharge ports 13.

On the other hand, the friction members and the core plates on the die 12 are urged against the upper surface of the die 12 by the urging surface 9. In this case, since the die underlying the core plates is in a heated condition, the core plates and the friction members on the core plates are heated, so that the adhesive coated on the core plates is temporarily melted by the heat and then is hardened after adhesion to the friction members. That is to say, the friction members are positively adhered to the core plates by the heat and pressure. In this way, plural kinds of friction plates having different diameters, i.e., the large-diametered friction plate 10 and the small-diametered friction plate 20 can be simultaneously separated and manufactured.

Second Embodiment

Figure 4:
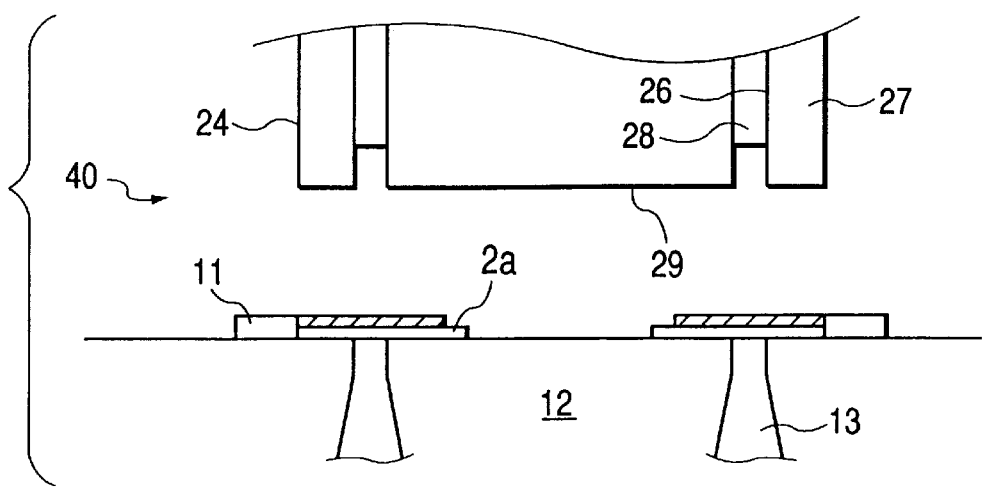
FIG. 4 is a side view of a friction member adhering apparatus used in adhering and stamping processes in a second embodiment of the present invention, a part of which is a sectional view taken along the line A—A in FIG. 1B.
Figure 5:
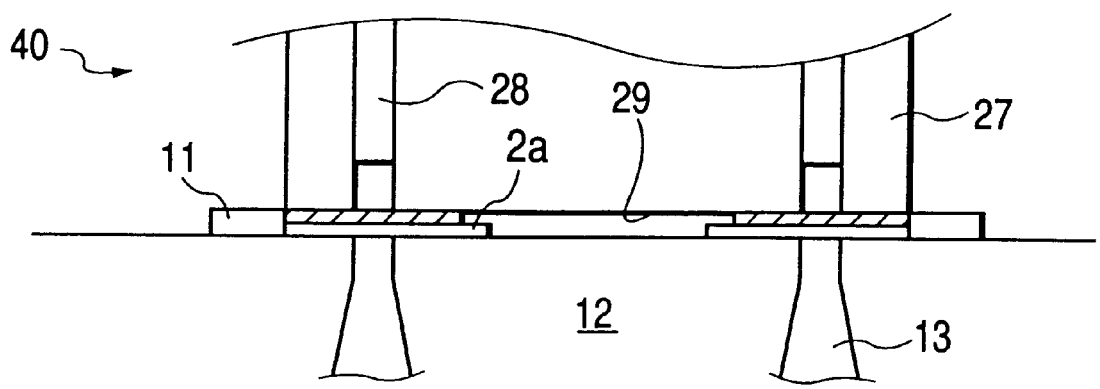
FIG. 5 is a side view of the friction member adhering apparatus of FIG. 4, showing a condition that an urging member abuts against the friction member.
Figure 6:
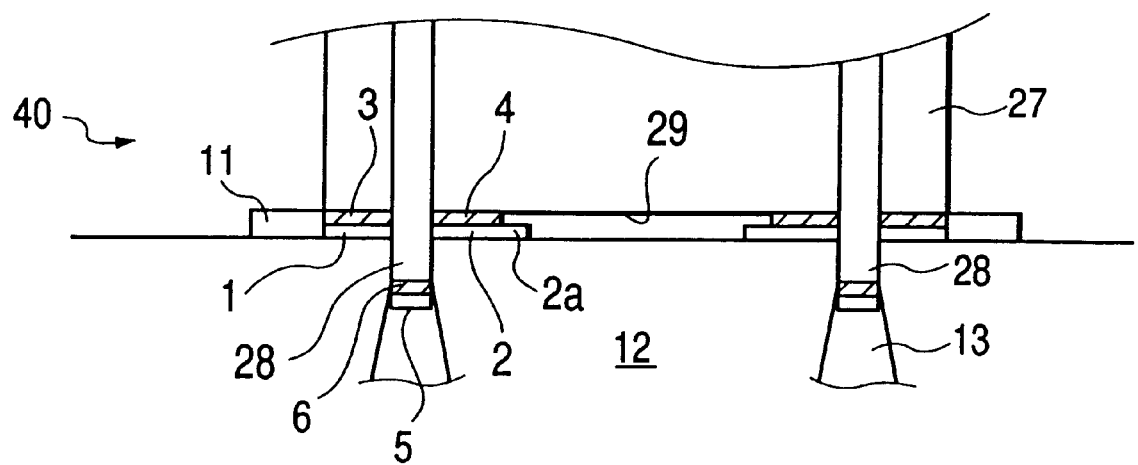
FIG. 6 is a side view of the friction member adhering apparatus of FIG. 2, showing a condition after joint portions are stamped.
Figure 7:
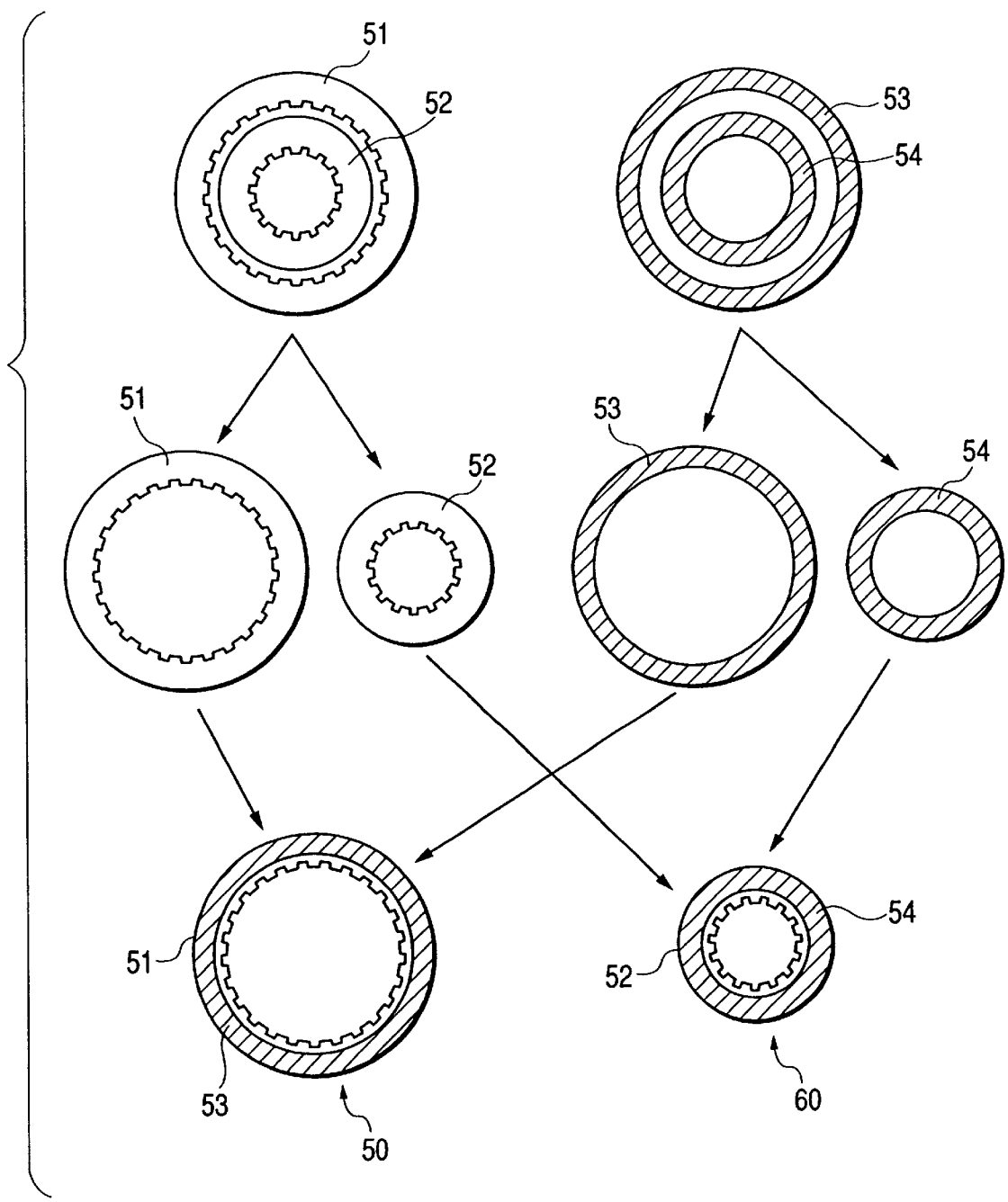
FIG. 7 is a front view showing processes of a conventional method for manufacturing a friction plate.

FIGS. 4 to 6 are side views of adhering and stamping processes in a second embodiment of the present invention, a part of which is a sectional view taken along the line A—A in FIG. 1B.

Since the fundamental construction is the same as that of the first embodiment, explanation thereof will be omitted. In the second embodiment, a construction of an urging member differs from that in the first embodiment.

A friction member adhering apparatus 40 for adhering and stamping the friction members and the core plates stamped by a press (not shown) comprises a press portion 27 for urging the friction members against the core plates, an urging member 24 having punches 28 slidably received in vertical holes 26 of the press portion 27 for vertical movement, and a die 12 which is disposed below the urging member 24 and on which the friction members and the core plates are rested.

The press portion 27 and the punches 28 are discrete members, and the punches 28 are protruded downwardly from an urging surface 29 by a predetermined amount.

When the urging member 24 is lowered from a position shown in FIG. 4 by a drive mechanism (not shown), the urging surface 29 abuts against the friction members. This condition is shown in FIG. 5. In this condition, the joint portions are not yet stamped. From this condition, the punches 28 driven by drive mechanism (not shown) are shifted downwardly along the vertical holes 26.

When the punches 28 continue to be lowered, the punches firstly abut against the friction members and then start to stamp the joint portions 6 of the friction members and the joint portions 5 of the core plates. When the urging member 24 is further lowered and the stamping is completed, the urging surface 29 of the urging member 24 abuts against the friction members, thereby heating and pressurizing the friction members. This condition is shown in FIG. 6. The stamped joint portions 5, 6 are discharged out of the apparatus through the discharge ports 13. Thus, as is in the first embodiment, plural kinds of friction plates having different diameters can be manufactured simultaneously.

When the friction plates are separated after the adhering process is completed, the joint portions may be stamped by another press after the adhesion has been effected by using a conventional adhering device.

In the above-mentioned embodiments, while an example that the friction plates are formed by simultaneously stamping the core plates and the friction members having two different diameters was explained, the kind of the friction plates is not limited to two, but, for example, three or more kinds of friction plates can be formed simultaneously.

Further, although the punches of the urging member may be constituted by pin-shaped projections having bottom surfaces corresponding to areas of the joint portions and having the same number as that of the joint portions, the punches may be replaced by a substantially annular cylinder which can pass through a gap between the large core plate and the small core plate.

According to the friction plate manufacturing method and apparatus of the present invention, the following advantages can be obtained.

In comparison with the conventional techniques, the number of the adhering processes can be reduced or the adhering time can greatly be reduced. Further, the number of set changes in the equipment can also be reduced. Furthermore, when the parts are conveyed, parts having different diameters are not required to be sorted. As a result, productivity can be improved greatly.

What is claimed is:

1. A method for manufacturing a plurality of friction plates obtained by adhering friction members to core plates, said method comprising;

simultaneously stamping a plurality of substantially annular and coaxial core plates having different diameters with a joint portion remaining therebetween;

simultaneously stamping a plurality of substantially annular and coaxial friction members having different diameters corresponding to said core plates and with a joint portion remaining therebetween, to permit adhesion to said core plates; and stamping said joint portions of said friction members and said core plates when or after said friction members are adhered to said core plates.

2. A method for manufacturing friction plates according to claim 1, wherein, in the stamping of said joint portions, an urging member integrally including a punch to stamp said joint portions and a press portion to press said friction members and said core plates is used, and wherein said punch and said press portion are simultaneously operated, so that, immediately after said joint portions are stamped, said urging member presses said friction members and said core plates.

3. A method for manufacturing friction plates according to claim 1, wherein, in the stamping of said joint portions, an urging member separately including a punch to stamp said joint portion and a press portion to press said friction members and said core plates is used, and wherein said punch and said press portion are operated, so that, while said press portion holds said friction members and said core plates by pressure, said punch is operated to stamp said joint portions.

4. An apparatus for manufacturing a plurality of friction plates obtained by adhering friction members to core plates, comprising:

a mechanism which simultaneously stamps a plurality of substantially annular and coaxial core plates having different diameters with a joint portion remaining therebetween;

a mechanism which simultaneously stamps a plurality of substantially annular and coaxial friction members having different diameters corresponding to said core plates and with a joint portion remaining therebetween, to permit adhesion to said core plates; and a mechanism which stamps said joint portions of said friction members and said core plates when or after said friction members are adhered to said core plates.

5. An apparatus for manufacturing friction plates according to claim 4, wherein said mechanism which stamps said joint portions comprises an urging member integrally including a punch which stamps said joint portions and a press portion which presses said friction members and said core plates, and wherein said punch and said press portion are simultaneously operated, so that, immediately after said joint portions are stamped, said urging member presses said friction members and said core plates.

6. An apparatus for manufacturing friction plates according to claim 4, wherein said mechanism which stamps said joint portions comprises an urging member separately including a punch which stamps said joint portions and a press portion which presses said friction members and said core plates, and wherein said punch and said press portion are operated, so that, while said press portion holds said friction members and said core plates by pressure, said punch is operated to stamp said joint portions.

* * * * *